Nov. 5, 1957 H. G. JOSEPHSON 2,811,782
INDEXING FIXTURE
Filed Feb. 9, 1955
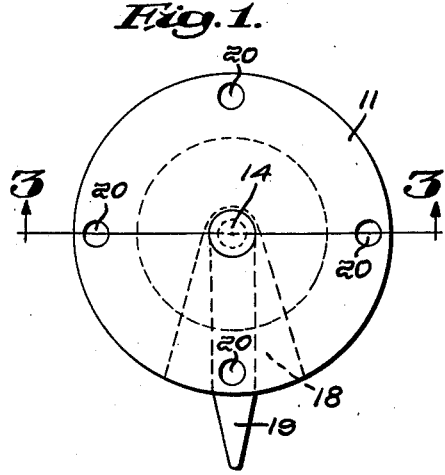
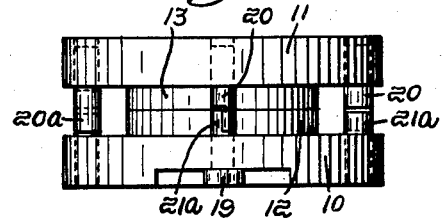
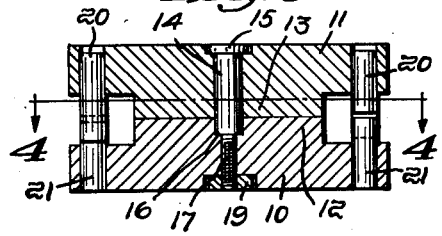
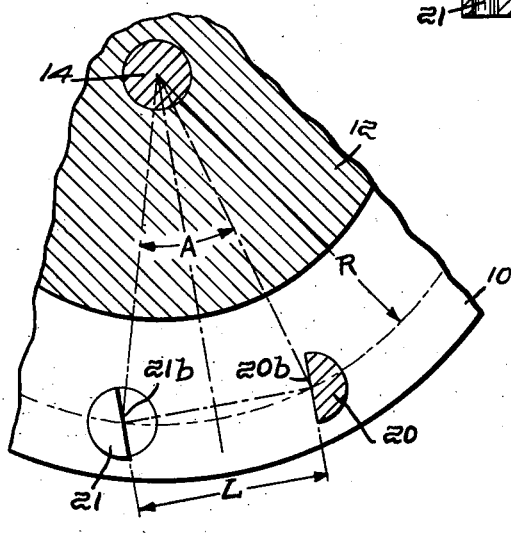
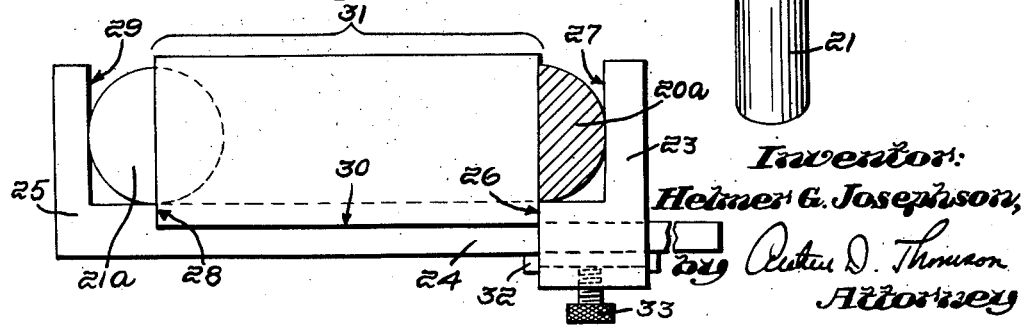
Inventor:
Helmer G. Josephson,
by Arthur D. Thomson
Attorney

United States Patent Office 2,811,782
Patented Nov. 5, 1957

2,811,782
INDEXING FIXTURE
Helmer G. Josephson, Saugus, Mass.

Application February 9, 1955, Serial No. 487,020

1 Claim. (Cl. 33—174)

This invention relates to indexing fixtures of the general type used on drill presses, milling machines and other such machine tools to gauge angular dimensions on a piece of work.

A number of tools and fixtures have been devised for laying out angles in machine work. Some of these devices depend basically on the sine bar principle for measuring angles in terms of linear dimensions, as does the fixture here described. Most of the devices hitherto employed, however, are either limited in range, or have relatively poor accuracy in certain regions of their range, are rather complex in construction, and consist of a number of accurately machined parts which are subject to constant wear and consequently to fairly rapid loss of accuracy.

The principal object of this invention is to provide a fixture for gauging and laying out angles which is extremely accurate through the full 360° range, which is simple in construction and operation, which is made up of a few relatively simple parts, and in which the parts which are critical to the accuracy of the device are subject to a minimum of wear. Another object is to provide a fixture on which the linear measurements may be made by means of standardized gauge blocks of a type already in common use in machine shops, so as to minimize expense and duplication of precision equipment in the shop. Other objects and novel features will be apparent from the description which follows.

The fixture consists in general of a table, on which a piece of work may be clamped or otherwise mounted, rotatably mounted on a base, the table and base carrying a number of cylindrical plugs disposed in a circle. The plugs are rotatable in the base and the table and having semi-cylindrical end portions, the flat faces of which are accurately machined. To set the table at a desired angle with respect to its initial starting position, a base plug and a table plug are aligned with the flat faces of their semi-cylindrical portions adjoining, and the table is then rotated to a position in which a gauge block, or set of blocks, representing a linear dimension geometrically related to the desired angle, fits between the aforesaid flat faces. To insure parallelism of the faces when the measurement is made, the gauge block, or set of blocks, is preferably placed in a holder which fits around the plugs and lines up the semi-cylindrical portions.

In the drawings illustrating the invention:

Fig. 1 is a plan view of a fixture constructed according to the invention;

Fig. 2 is a side elevation of the fixture;

Fig. 3 is a cross-section taken along line 3—3 of Fig. 1;

Fig. 4 is an enlarged fragmentary cross-section taken along line 4—4 of Fig. 3, indicating the geometric relationship between the table angle and the gauged linear dimension;

Fig. 5 is an exploded isometric view, somewhat enlarged, of a pair of upper and lower plugs; and Fig. 6 is an enlarged plan view of the gauge block holder engaged with a pair of plugs.

The base 10 and table 11 are shown as being generally circular, and have cylindrical hubs 12 and 13, respectively, with flat end surfaces which are machined parallel to the upper surface of the table. The base and table are rotatably connected together by means of a shaft 14 which has a head 15, seated in a counterbored recess in the table, a shoulder 16 seated in a counterbored recess in the base, and a threaded lower end 17. In the bottom part of the base is a pie-shaped recess 18. A handle 19 is mounted in this recess and is tapped at its inner end to engage the threaded end of the shaft. By moving handle 19 in one direction, shaft 14 is drawn down to jam the flat faces of the hubs tightly together and thus lock the table in any desired position. Movement of the handle in the opposite direction loosens the shaft and frees the table so that it can be easily rotated. It is understood that the table is provided with bolt holes or other conventional means for attaching a piece of work, and the base may also have some conventional provision for attaching the fixture to a machine. Such means are well known in the tool art and are not here illustrated.

Mounted at intervals around the periphery of the table are a number of cylindrical plugs 20. The plugs are arranged with their centers lying on a circle concentric with the shaft and are equally spaced. Four plugs spaced 90° apart are here shown, but more or fewer may be used. The plugs are rotatably mounted in accurately bored holes in the table and fit fairly tightly in the holes so that they can be turned by hand but will tend to stay in any position in which they are placed.

A number of plugs 21 of the same general character as plugs 20 are rotatably mounted on base 10 and are disposed on a circle of the same radius as plugs 20. As shown in Fig. 5, each plug 20 has a depending semi-cylindrical portion 20a with a flat face 20b which is accurately machined to lie on a plane through the axis of the plug. Each plug 21 has an upstanding semi-cylindrical portion 21a with an accurately machined flat face 21b. Plug 20 is preferably provided with a groove 22 near the base of portion 20a so that a screw driver can be inserted to pull the plug down and remove it from the fixture. The layout operation is started from an initial position in which the flat faces of plugs 20 engage the faces of plugs 21.

The principle of angular measurement by use of the fixture is shown in Fig. 4. The table has been rotated from its starting position through an angle designated A. The radius of the circle on which the centers of the plugs are located is designated R, and L designates the distance between centers of an upper and lower plug. From the geometrical arrangement it is apparent that $$\text{sine } \tfrac{1}{2}A = \frac{L/2}{R}$$

Therefore $L = 2R \text{ sine } \tfrac{1}{2}A$, or $D \text{ sine } \tfrac{1}{2}A$ where D is the diameter of the circle on which the centers of the plugs are located. The distance L between the centers of a pair of upper and lower plugs can thus be readily calculated. The calculation is facilitated if the diameter D is made equal to a whole power of ten, for example ten inches, as the lengths corresponding to various angles can then be readily selected from standard trigonometric tables. Specially calibrated tables can also be supplied with the device.

The distance L corresponding to any desired angle is accurately set by means of standard gauge blocks which are inserted between the faces 20b and 21b of a pair of plugs. To insure that the faces of the plugs are parallel and fit squarely to the end faces of the gauge block or set of blocks, a holder such as that illustrated in Fig. 6 is preferably used. This holder consists of a movable jaw 23 slidably mounted on a handle 24 which carries a fixed jaw 25. Jaw 23 has a first jaw face 26 and a second jaw face 27 which is offset from face 26 by exactly the radius of one of the plugs, and jaw 25 has similar offset faces 28 and 29. These faces are perpendicular to a flat upper surface 30 of the handle. The gauge block or set of gauge blocks, 31, used to establish the dimension L, rests squarely on surface 30 between jaw faces 28 and 29, and semi-cylindrical portions 20a and 21a of the upper and lower plugs will seat between the ends of the gauge block and jaw faces 27 and 29, respectively. Portions 20a and 21a will fit into the holder only when their flat faces are aligned parallel to each other and to the ends of the gauge block. The sliding jaw 23 is preferably provided with a clamping plate 32 and a screw 33 for locking the jaw in the desired position on the handle.

With the 90° spacing of the plugs, measurement can be made up to about 90° (less allowance for the diameter of a plug) by direct setting of the linear distance between a table plug and the base plug with which it is aligned at the starting position. Preferably, however, to avoid using gauge block assemblies which are too long for convenient handling, measurements are made in this manner for angles up to 45°. The table plug being used is then turned around and the linear dimension corresponding to the complement of the desired angle is set between the table plug and the base plug next in line. To make measurements or to set the table to angles greater than 90° the table plugs are removed so that the table will swing past the 90° position. Any one of the plugs is then replaced and the measurement is made to the nearest plug on the base. This measurement will correspond to the sine of ½ the angle obtained by subtracting 90° from the desired angle.

It will be noted that the only critical dimensions on the device are the initial location of the holes for the gauge plugs and the disposition of the flat faces of the plugs. None of the parts which must be accurately machined are working parts, that is they do not have to move the table or to drive any measuring device. Wear on these parts is accordingly negligible and they will retain their accuracy indefinitely. The device is simple and convenient to use as the measurement can be made between any pair of plugs which happen to be accessible. The operator need not change his position with respect to the machine, for example in measuring angles over 90° or over 180°, as he can perform the measurement on the set of plugs which happens to be nearest him. The entire device is considerably more rugged than prior devices which have used friction drives or micrometer elements, and is also much less expensive to manufacture. The gauge blocks which are the only precision measuring elements required are standard equipment in most machine shops and are ordinarily checked for accuracy and calibrated at regular intervals as part of the routine operations.

I claim:

An indexing fixture for gauging angular dimensions comprising a base, a table rotatably mounted on said base and having a lower surface spaced therefrom, a first cylindrical plug rotatably mounted on said table with its axis parallel to the axis thereof, said plug having a semi-cylindrical extension, with a flat face disposed in the axial plane of the plug, projecting below said lower surface, a second cylindrical plug of the same diameter as the first, rotatably mounted on said base, said second plug having a semi-cylindrical extension, with a flat face disposed in the axial plane of the plug, projecting toward said table, said faces being engageable to establish an initial position of the table, and a gauge block holder having a pair of relatively movable jaws, the jaws having a first pair of jaw faces adapted to engage a gauge block and a second pair of jaw faces each offset from one of the first pair by the radius of a plug, said second pair of jaw faces each being adapted to engage one of said extensions to align the flat faces of the same parallel.

References Cited in the file of this patent
UNITED STATES PATENTS

| | | |
|---|---|---|
| 672,213 | Holcomb | Apr. 16, 1901 |
| 1,256,794 | Hanton | Feb. 19, 1918 |
| 2,173,519 | Jones | Sept. 19, 1939 |
| 2,324,476 | Becker | July 20, 1943 |
| 2,406,906 | Saunders | Sept. 3, 1946 |
| 2,409,817 | Webber | Oct. 22, 1946 |
| 2,539,597 | Staples | Jan. 30, 1951 |
| 2,645,023 | Trbojevich | July 14, 1953 |